(12) United States Patent
Terada et al.

(10) Patent No.: US 7,560,890 B2
(45) Date of Patent: Jul. 14, 2009

(54) POSITION CONTROLLER AND CONTROLLING METHOD THEREFOR

(75) Inventors: Kei Terada, Tokyo (JP); Masahiko Yoshida, Tokyo (JP); Tetsuaki Nagano, Tokyo (JP); Hidetoshi Ikeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 618 days.

(21) Appl. No.: 10/554,368

(22) PCT Filed: Jul. 29, 2004

(86) PCT No.: PCT/JP2004/010801

§ 371 (c)(1),
(2), (4) Date: Oct. 25, 2005

(87) PCT Pub. No.: WO2006/011203

PCT Pub. Date: Feb. 2, 2006

(65) Prior Publication Data

US 2007/0007927 A1      Jan. 11, 2007

(51) Int. Cl.
*G05B 11/01*    (2006.01)
(52) U.S. Cl. ....................... 318/630; 318/560
(58) Field of Classification Search ................ 318/630, 318/560
See application file for complete search history.

(56) References Cited

U.S. PATENT DOCUMENTS

| 4,851,748 | A  | * | 7/1989 | Daggett et al. ........... 318/568.2 |
| 5,467,004 | A  | * | 11/1995 | Matsuo et al. .............. 318/807 |
| 5,598,077 | A  | * | 1/1997 | Matsubara et al. ..... 318/568.22 |
| 6,052,252 | A  | * | 4/2000 | Kim ........................ 360/78.09 |
| 6,154,424 | A  | * | 11/2000 | Kao et al. ................. 369/44.28 |
| 6,249,738 | B1 | * | 6/2001 | Higashimata et al. ......... 701/96 |
| 6,519,109 | B1 | * | 2/2003 | Price et al. ............... 360/78.09 |
| 7,084,596 | B2 | * | 8/2006 | Iwashita et al. ............. 318/638 |
| 2003/0169010 | A1 | * | 9/2003 | Tomita ....................... 318/652 |

FOREIGN PATENT DOCUMENTS

| JP | 06 166550 A   | 6/1994 |
| JP | 07 333084 A   | 12/1995 |
| JP | 08 331881 A   | 12/1996 |
| JP | 09 2822008 A  | 10/1997 |
| JP | 2001/231280 A | 8/2001 |
| JP | 2001/247920 A | 9/2001 |
| JP | 2002/2186269 A | 6/2002 |
| JP | 2003/3023785 A | 1/2003 |

* cited by examiner

*Primary Examiner*—Lincoln Donovan
*Assistant Examiner*—David S Luo
(74) *Attorney, Agent, or Firm*—Sughrue Mion, PLLC

(57) ABSTRACT

An objective is to obtain a high robust position controller and a controlling method therefor, with respect to their technique in which control gain, in order to prevent an overshoot due to frictions, is most suitably adjusted. The position controller having a feedforward system includes: a friction-coefficient-estimated-value setting unit for setting arbitrary friction-coefficient-estimated-values; an overshoot-prevention-gain calculator for determining speed-integral-term feedforward gain, based on estimated friction-coefficient values set by the friction-coefficient-estimated-value setting unit; and a speed feedforward multiplying unit for calculating the product of the speed-integral-term feedforward gain multiplied by a feedforward command value that is based on a positional command; the multiplication product from the speed feedforward multiplying unit being used to reduce the feedforward term.

12 Claims, 8 Drawing Sheets

POSITION CONTROLLER AND CONTROLLING METHOD THEREFOR

TECHNICAL FIELD

The present invention relates to position controllers and methods thereof for controlling positions in machinery systems such as machine tools and semiconductor manufacturing apparatus.

BACKGROUND ART

In position controllers, friction characteristics that targets to be controlled (hereinafter referred to as controlled targets) have in machinery systems vary greatly depending on temperature and across the ages; therefore, even if, taking into consideration the friction characteristics so that overshoot never happens, a gain most suitable for the controlled target is set, due to the varying of the friction characteristics, the overshoot may sometimes happen when the friction increases, or, on the contrarily, even if the overshoot does not happen when the friction decreases, it sometimes takes a longer time before the position has been decided. Therefore, in a machine in which the friction varies, in order to prevent overshoot in response to such friction characteristic variations, technique has been needed to automatically adjust the control gain.

An example of conventional technique is disclosed in Japanese Patent Publication No. 3,463,355. According to this conventional technique, a plant is driven by applying thereto a speed-command signal for identifying viscous friction, and by constructing a speed PI-control system in a servo amplifier, "PI-speed-control-system command torque" that is a signal outputted from the system, and "equivalent PI-speed-control-system command torque" in which the signal outputted from the system is passed through a primary delay filter are observed. Because the steady value of the difference signal between the "PI-speed-control-system command torque" and the "equivalent PI-speed-control-system command torque" converges on a value depending on a viscous friction coefficient, the viscous friction coefficient is identified using the value and given parameters.

Next, in a speed control system, a value obtained by multiplying an actual speed in the plant by the identified value of the viscous friction coefficient is set as viscous friction compensation torque, and then the torque is added to the command torque. As a result, the method of the conventional technique prevents, with this viscous-friction compensation torque compensating the friction torque, overshoot due to friction.

[Patent Document 1]
Japanese Patent Publication No. 3,463,355.

DISCLOSURE OF THE INVENTION

However, according to the viscous-friction-torque compensation method of the conventional technique, because, using an actual speed, torque is adjusted to be increased so as to compensate the friction torque, the friction compensation may induce resonance. Moreover, the controlling may diverge and oscillate near the nil speed where the sign of the compensation torque is inverted corresponding to the sign of the speed. Furthermore, because the system compensates the friction torque toward positive, when an error is included in estimated friction-coefficient results, a problem has been found in that the overall robustness of the control is relatively low, for example, overshoot or undershoot occurs.

The present invention is made to solve the problem described above. A position controller according to the invention, having a feedforward system, includes: a friction-coefficient-estimated-value setting means for setting arbitrary values estimating friction coefficients; an overshoot-prevention-gain calculation means for determining speed-integral-term feedforward gain, based on estimated friction-coefficient values set by the friction-coefficient-estimated-value setting means; and a speed feedforward multiplying means for calculating the product of the speed-integral-term feedforward gain multiplied by a feedforward command value that is based on a positional command; the multiplication product from the speed feedforward multiplying means being used to reduce the feedforward term.

Moreover, the position controller, having a feedforward system, includes: a friction-coefficient estimating means for estimating a friction coefficients from disturbance torque estimated in controlling a plant; an overshoot-prevention-gain calculation means for determining speed-integral-term feedforward gain, based on the friction-coefficient estimated values estimated by the friction-coefficient estimating means; and a speed feedforward multiplying means for calculating the product of the speed-integral-term feedforward gain multiplied by a feedforward command value that is based on a positional command; the multiplication product from the speed feedforward multiplying means being used to reduce the feedforward term.

According to such position controller and the controlling method as above, when the control gain for preventing the overshoot is automatically adjusted, the overshoot is prevented with the gain based on the disturbance torque having been estimated, being operated so as to decrease the feedforward; therefore, the possibility of generating mechanical resonances is small, and because the compensation torque is not inverted in response to speed, the controlling does not oscillate near the nil speed; consequently, a highly robust position controller and a controlling method thereof can, be obtained.

BEST MODE FOR CARRYING OUT THE INVENTION

EMBODIMENT 1

Figure 1:
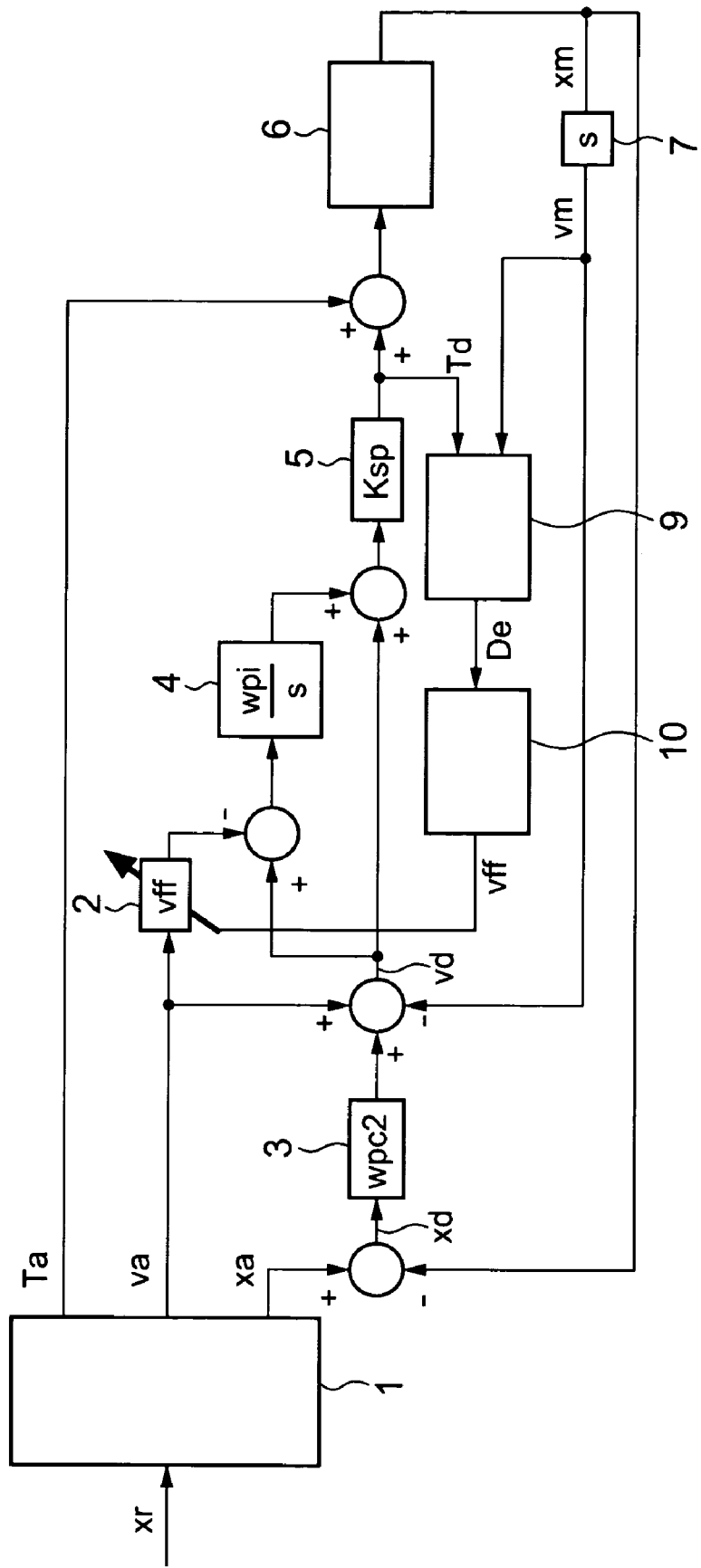
FIG. 1 is a block diagram illustrating a position controller in Embodiment 1 according to the present invention.

FIG. 1 represents a block diagram of entire Embodiment 1 according to the present invention. In the block diagram, feedback control is based on control using a position P (proportional) and speed PI (proportional and integral).

A configuration of Embodiment 1 is explained.

A model calculation means 1 inputs a command position xr and outputs model torque Ta, a model speed va, and a model position xa that are ideal for position control.

Because the model torque Ta, the model speed va, and the model position xa are outputted as models of suitable acceleration, speed, and position in response to the command position, various configurations can be considered for use in the model calculation means 1 corresponding to each model. A case is given in which the model position simply equals the command position, the model speed is given as a first-order differential of the command position, and the output of the model torque is set at "0", or the model torque is given by multiplying a second-order differential of the command position by a model inertia, etc. The interior of the model calculation means 1 can be also configured in such a way that the output from the model calculation means 1 comes into uniform acceleration, uniform speed, and uniform deceleration in response to the command position xr.

A position-proportional compensation means 3 outputs a value obtained by multiplying a position deviation xd between the outputted model position xa and an actual position xm detected from a plant 6 as a plant, by a position-proportional gain wpc2. A deviation, which is referred to as a speed deviation vd, is obtained between the sum of the outputted value from the position-proportional compensation means 3 and the model speed va, and an actual speed vm detected through a differentiation means 7 from the plant 7 as the controlled target; then, an integral compensation means 4 inputs a deviation signal between the speed deviation vd, and a value obtained by multiplying the model speed va by a speed-integral-term feedforward gain vff of speed feedforward multiplying means 2, and after integrating the deviation, outputs a signal of the integrated deviation being multiplied by a factor wpi. A speed-proportional compensation means 5 outputs a feedback torque command obtained by multiplying the sum of the speed deviation vd and the output from the integral compensation means, by a speed-proportional gain Ksp. The sum of the feedback torque command and the model torque Ta is made to be a torque command. Here, a torque controlling system is omitted, actual torque is considered equal to the torque command, and this torque command is made to be the actual torque Tm, which is inputted into the plant 6 as the controlled target. The plant 6 moves based on the inputted actual torque, and the position xm varies accordingly.

The derivation of the speed-integral-term feedforward gain vff of the speed feedforward multiplying means 2 is explained. In the control of Embodiment 1, in a case in which a correct inertia value is set in the model calculation means 1, and the control gain of the feedback system is high enough, any problem does not occur even if torque obtained by subtracting the model torque Ta from the torque command is deemed to be disturbance torque. In this case, the output of the feedback torque command from the speed-proportional compensation means 5 is deemed as a disturbance-torque estimated value Td, and the estimated value is inputted into friction-coefficient estimating means 9.

The friction-coefficient estimating means 9 derives a friction-coefficient estimated value De from the disturbance-torque estimated value Td and the actual speed vm. The friction-coefficient estimated value De can be theoretically expressed, from the relationship between the disturbance-torque estimated value Td, and the actual speed vm, by the following equation.

$$De = |vm|/|Td| \qquad (1)$$

In an overshoot-prevention-gain calculation means 10, the speed-integral-term feedforward gain vff is outputted in order to prevent overshooting corresponding to the friction-coefficient estimated value De that has been outputted from the friction-coefficient estimating means 9.

Figure 2:
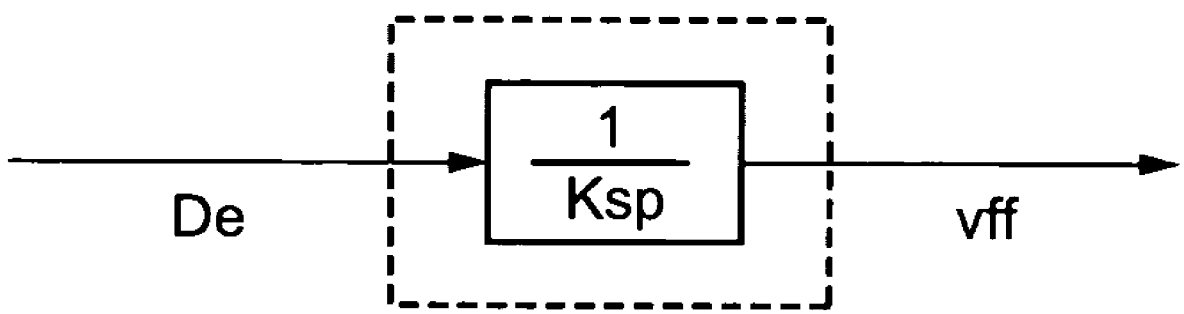
FIG. 2 is a detailed view illustrating a speed feedforward multiplying means 2 in Embodiment 1 according to the present invention.

FIG. 2 is a detailed view of the speed feedforward multiplying means 2 in Embodiment 1 according to the present invention. Theoretically, the most suitable value of the feedforward gain for preventing the overshoot due to the friction is given by Equation 2.

$$vff = De/Ksp \qquad (2)$$

This equation is explained.

First, regarding the reason why the overshoot generates in accordance with the friction, it is considered that because the difference between the model speed va and the actual speed vm occurs in presence of the friction, the speed-integral term is accumulated by time-integrating torque that compensates the amount corresponding to the friction torque, and because when settling positioning after a predetermined time has progressed, the integral compensation means 4 compensates the friction torque that has been time-integrated, the controlling near a speed being nil tends to temporarily diverge; consequently, the overshoot occurs, and the time to converge it becomes longer. Therefore, in response to the output from the integral compensation means 4, if the speed-integral-term feedforward gain vff is given in such a way that the amount of the friction torque is decreased from the integral term thereof, the overshoot can be suitably prevented. That is, as the most suitable value of the speed-integral-term feedforward gain vff, the value may be given so that the constant value of an integral-term input h, when accelerating and decelerating, becomes "0".

Now, the transfer function of the plant 6 is given by Equation 3, where J is total inertia, and D is a friction coefficient.

$$Gp(s) = \frac{1}{J \cdot s^2 + D \cdot s} \qquad (3)$$

Providing that the input into the integral compensation means 4 is h, the transfer function calculated from the command position xr to h gives Equation 4, where Ga(s) is a model transfer function.

$$h = Ga(s) \cdot \frac{-vff \cdot J \cdot s^4 + \{D - vff(K_{sp} + D)\}s^3 +}{J \cdot s^3 + (K_{sp} + D)s^2 +} \qquad (4)$$
$$\frac{(D - vff \cdot K_{sp})\omega_{pc2} \cdot s^2}{K_{sp}(\omega_{pc2} + \omega_{pi})s + K_{sp}\omega_{pc2}\omega_{pi}}$$

In the above equation, considering the value of h in the unit accelerating/decelerating state, h steadily becomes constant following Equation 5. However, load torque thereof is neglected.

$$h = D - vff \cdot K_{sp} \quad (5)$$

In the above equation, providing h=0, vff in which the constant value of the integral-term input equals "0" can be obtained. As described above, Equation 2 that derives the theoretically most suitable value of the speed-integral-term feedforward gain vff can be obtained using the friction-coefficient estimated value De.

After the friction-coefficient estimating means 9 outputs the friction-coefficient estimated value De that has been obtained from the disturbance-torque estimated value Td and the actual speed vm, the overshoot-prevention-gain calculation means 10 calculates the speed-integral-term feedforward gain vff for preventing the overshoot using the friction-coefficient estimated value De as input, and then outputs the gain. Using the speed-integral-term feedforward gain vff having been obtained, the gain of the speed feedforward multiplying means 2 is rewritten. The speed feedforward multiplying means 2 multiplies the model speed va by the speed-integral-term feedforward gain vff. By subtracting the integrated value of the speed feedforward multiplying means 2 from the speed deviation that is the input to the integral compensation means 4, the overshoot is controlled.

Next, an operation in Embodiment 1 is explained.

First, an operation in a case in which the overshoot is not controlled is explained. The operation in the case in which the overshoot is not controlled can be explained as a case in which the speed-integral-term feedforward gain vff is assumed to be "0".

Figure 3A:
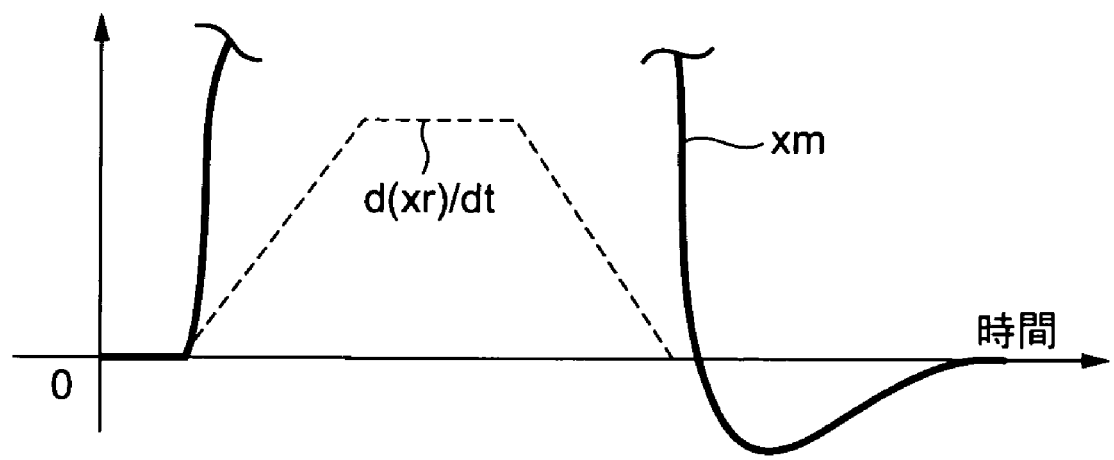
FIGS. 3A and B are waveforms representing an operation in Embodiment 1 according to the present invention.
Figure 3B:
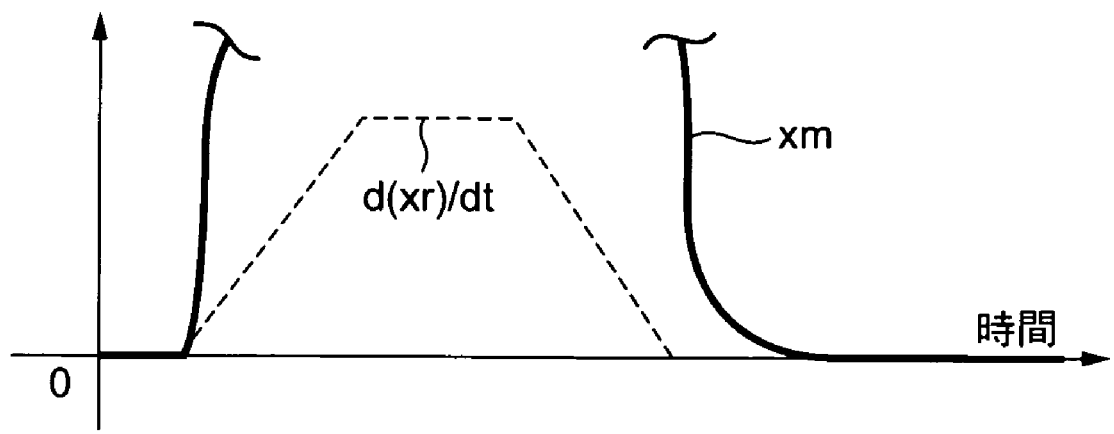

FIG. 3 is waveform views representing an operation in Embodiment 1 according to the present invention. FIG. 3(a) represents a case in which the speed-integral-term feedforward gain vff is set at "0", meanwhile FIG. 3(b) represents a case in which the speed-integral-term feedforward gain vff is set using the friction-coefficient estimated value De. In both the waveform views, the horizontal axes are time, the vertical axes are speed, the vertical components of the broken lines correspond to speed, and those of the solid lines correspond to position.

At this time, the model calculation means 1 outputs the model torque Ta that is ideal for servo-controlling, the model speed va, and model position xa, then the plant 6 operates so as to follow the model. When the model of the model calculation means 1 completely agrees with the actual plant 6, the actual speed and the actual position operate completely identically with the model speed and the model position, respectively; however, because a modeling error such as friction is actually included, the speed deviation vd and the position deviation xd occur. When the position deviation xd is included, by multiplying the position deviation xd by the position-proportional gain wpc2 of the position-proportional compensation means 3, and by performing feedback-control proportional to the position deviation xd, compensation against the position deviation xd is performed. Moreover, when the speed deviation vd is included, by performing the speed PI (proportional and integral) control of the feedback, the speed deviation is compensated; however, as represented in FIG. 3(a), overshoot occurs in the position deviation.

Next, a case in which the overshoot is controlled is explained. In FIG. 3(b), after the friction-coefficient estimated value De is estimated using the disturbance-torque estimated value Td and the actual speed, the speed-integral-term feedforward gain vff is most suitably set.

Because the speed-integral-term feedforward gain vff has a value larger than zero, it brings an effect that the speed feedforward term composed of the proportion and the integration is reduced; therefore, the result becomes equivalent to reducing the feedforward component in response to the position. That is, when any friction occurs, the output of the speed-proportional compensation means 5 is estimated as the disturbance-torque estimated value Td, using the friction-coefficient estimated value De that has been led in the friction-coefficient estimating means 9 from the disturbance-torque estimated value Td and the actual speed vm, the overshoot-prevention-gain calculation means 10 leads the speed-integral-term feedforward gain vff, and the speed feedforward multiplying means 2 uses a value obtained by multiplying the model speed by the speed-integral-term feedforward gain vff for reducing the speed feedforward term; thereby, because the viscosity included in the plant 6 is prevented, that is, a portion corresponding to the disturbance-torque that is in proportion to the speed is prevented, the amount of the gain equivalent to the disturbance-torque is excluded in integration; consequently, the overshoot can be prevented. In particular, near the command position, it is effectively prevented that the gain equivalent to the disturbance-torque is integrated over a period for setting a position, so that oscillation occurs when the speed becomes close to zero. Moreover, because the system compensates the gain towards reducing it in response to the friction torque, even in a case in which an error is also included in the friction-coefficient estimated result, both the overshoot and undershoot rarely occur. Furthermore, because the friction-coefficient estimating value De is sequentially estimated, positioning-control response is adjusted; consequently, the overshoot due to the friction can be prevented. Therefore, as a result, a high robust position controller can be obtained.

According to Embodiment 1, a feedforward-type position controller includes a friction-coefficient estimating means 9 for estimating a friction coefficient from disturbance torque that has been estimated when a plant is controlled, an overshoot-prevention-gain calculation means 10 for determining a speed-integral-term feedforward gain vff based on the friction-coefficient estimated value that has been estimated in the friction-coefficient estimating means 9, and a speed feedforward multiplying means 2 for calculating a value by multiplying the speed-integral-term feedforward gain vff by a speed-command value based on a command position xr, so as to reduce a feedforward term using the multiplied value of the speed feedforward multiplying means 2; therefore, when the control gain for preventing the overshoot is automatically controlled, the overshoot prevention is performed with the gain based on the estimated disturbance torque being worked towards reducing the feedforward, so that there is little possibility of generating a mechanical resonance, and compensation torque is not inverted in response to the speed; consequently, a high robust position controller in which the controlling near the speed being nil does not become unstable, and a controlling method therefor can be obtained.

Here, in Embodiment 1, the value obtained by multiplying the model speed va from the output of the model calculation means 1 by the speed-integral-term feedforward gain vff is subtracted from the speed deviation vd; however, as long as an effect according to the present invention is obtained, even if a value obtained by multiplying the speed feedforward term by the speed-integral-term feedforward gain vff is subtracted from a value such as the gain, a similar effect can be obtained; therefore, a configuration using the model calculation means 1 is not necessarily needed.

EMBODIMENT 2

In Embodiment 2 as contrasted to Embodiment 1, the output from the overshoot-prevention-gain calculation means 10 is mapped using a table corresponding to an actual condition of the plant 6.

Figure 4:
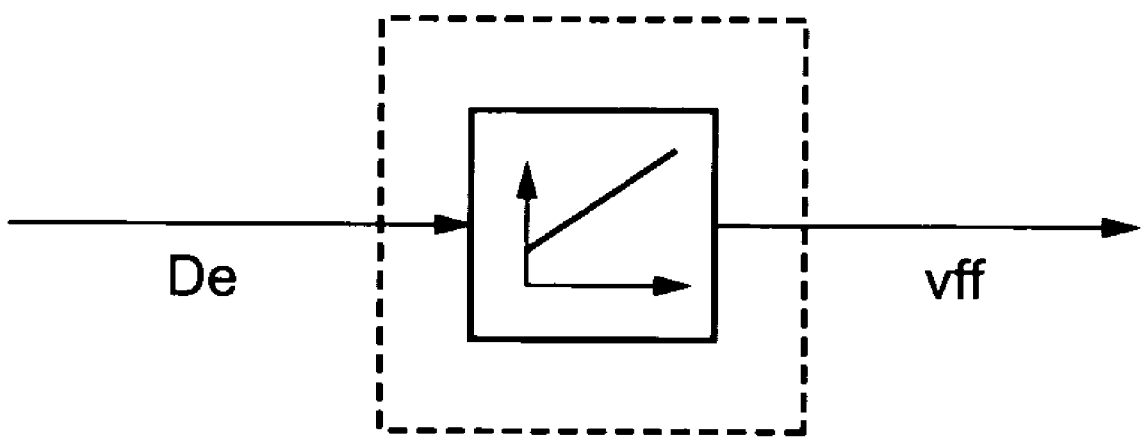
FIG. 4 is a block diagram illustrating an overshoot-prevention-gain calculation means 10 in Embodiment 2 according to the present invention.

FIG. 4 is a block diagram for the overshoot-prevention-gain calculation means 10 in Embodiment 2 according to the present invention. In Embodiment 1, position control has been explained in such cases in which the friction-coefficient estimated value De is approximately proportional to the speed.

However, depending on the structure of the plant 6, there also exist cases in which the friction-coefficient estimated value De irregularly varies without being proportional to the actual speed vm. In such cases, the speed-integral-term feedforward gain vff is not given by Equation 4 represented in Embodiment 1, but it is rather suitable that the friction-coefficient estimated values De corresponding to the speed-integral-term feedforward gains vff are prepared as a table in advance, and thereby the speed-integral-term feedforward gain vff is set based on the friction-coefficient estimated value De having been estimated. Although the friction-coefficient estimated value De itself is proportional to the actual speed vm according to Equation 2 in Embodiment 1, by setting the value based on the table, the speed-integral-term feedforward gain vff becomes possible to be set in accordance with cases, for example, in which the calculation is so complicated that the friction-coefficient estimated values De is proportional to the square of the actual speed vm, or in which variation is so irregular that it is difficult to be expressed by an equation.

Therefore, in addition to the configuration in Embodiment 1, by setting the speed-integral-term feedforward gain vff at the value that has been tabled in advance based on the friction-coefficient estimated values De, the overshoot can also be effectively prevented in a case in which the friction of the plant 6 irregularly varies in accordance with the actual speed vm.

EMBODIMENT 3

In Embodiment 3, the estimated disturbance torque Td in Embodiment 1 is estimated using a disturbance observation means.

Figure 5:
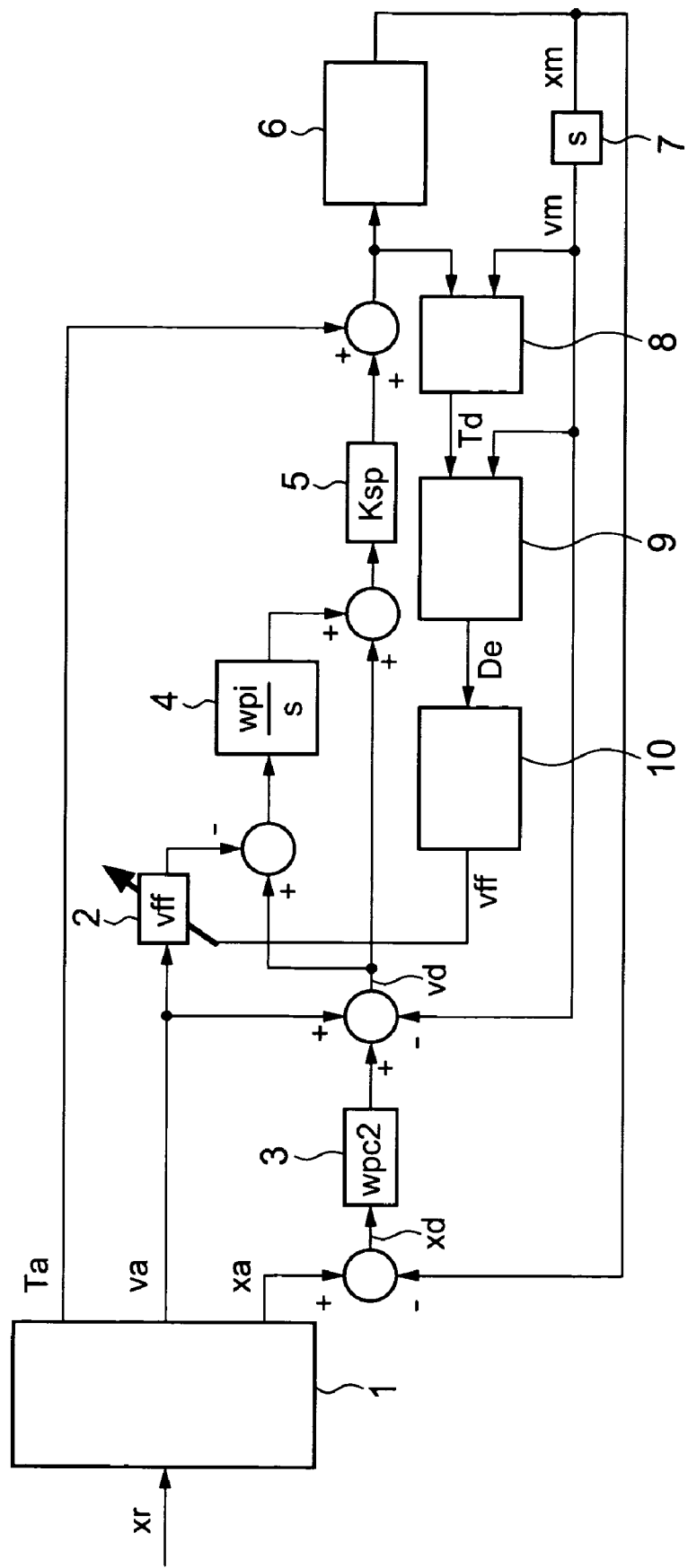
FIG. 5 illustrates a block diagram illustrating entire Embodiment 3 according to the present invention.

FIG. 5 illustrates an entire block diagram of Embodiment 3 according to the present invention. In FIG. 5, the same numerals as those in FIG. 1 denote the same or equivalent parts.

In Embodiment 1, when a correct inertia value is set in the model calculation means 1, and the control gain of the feedback system is high enough, it does not cause any problem in that a torque subtracted the model torque Ta from the torque command is estimated as the disturbance torque. In Embodiment 3, another case is represented in which, in order to estimate the disturbance torque Td as represented in FIG. 5, a disturbance observation means 8 estimates the disturbance-torque estimated value from an actual torque Tm inputted into the plant and the actual speed vm, then outputs to the friction-coefficient estimating means 9 the estimated value.

The disturbance observation means 8 estimates the disturbance torque by calculating using Equation 6.

$$Td = \frac{H}{s+H}(Tm - J \cdot s \cdot vm) \quad (6)$$

(s: differential operator, H: observation gain, J: set inertia value)

Therefore, according to Embodiment 3, because the means, in addition to the case of Embodiment 1, estimates the disturbance torque using the torque inputted into the plant 6 and the actual speed vm, the disturbance torque Td can be more stably estimated.

EMBODIMENT 4

In Embodiment 4, the friction-coefficient estimated value De estimated by the friction-coefficient estimating means 9 in Embodiment 1 is estimated using the least square method.

Although estimation of the friction coefficient is possible using Equation 1 represented in Embodiment 1, if the absolute value of the disturbance-torque estimated value Td is relatively low, the signal-to-noise ratio decreases; thus, there may be a casein which an accurate value is difficult to be estimated. In Embodiment 4, the friction coefficient is estimated by performing statistical calculation using the least square method. The friction-coefficient estimation equation using the least square method is given by Equation 7.

$$De = \frac{1}{s} P \times (|Td| - De \cdot |vm|) \quad (7)$$

(P: estimation gain)

Figure 6:
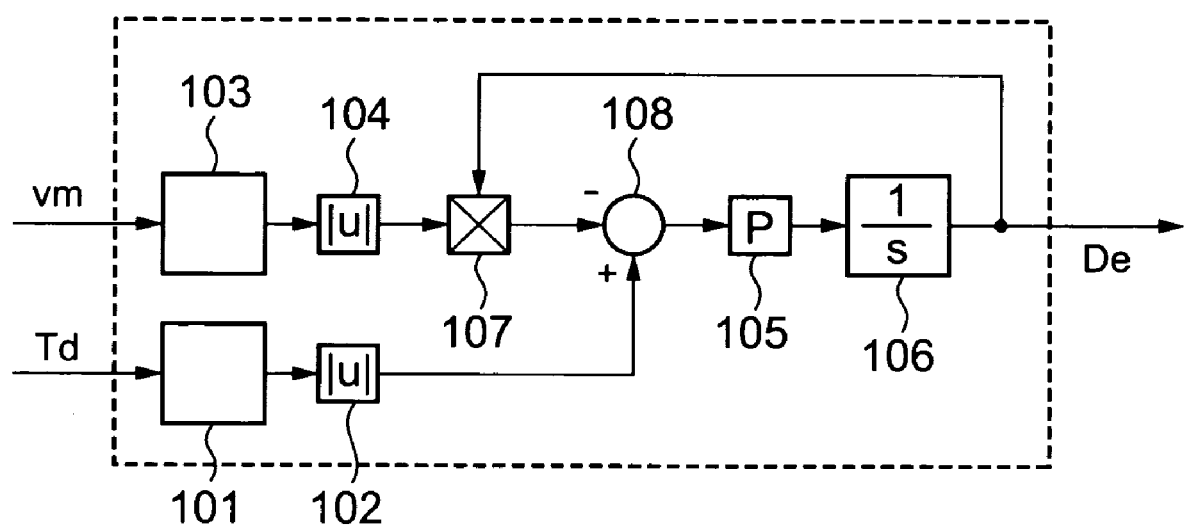
FIG. 6 is a detailed block diagram illustrating a friction-coefficient estimating means 9, based on the least square method, of a position controller in Embodiment 4 according to the present invention.

FIG. 6 is a detailed block diagram representing, based on the least square method, the friction-coefficient estimating means 9 of the position controller in Embodiment 4 according to the present invention. In order to remove from the disturbance-torque estimated value Td unnecessary components other than the friction torque, the disturbance-torque estimated value Td is passed through a filter 101 to extract only the friction-torque component. As the filter 101, for example, a bandpass filter that removes both high-frequency noise components and standing disturbance due to a gravity load and the like is generally used. From the obtained friction torque, the absolute value of the friction torque is derived by an absolute-value detection means 102. Moreover, regarding the actual speed vm, the absolute value of the actual speed is derived through a filter 103 and an absolute-value detection means 104. The friction coefficient is estimated, using the least square method, from these absolute values of the actual speed and the friction torque.

First, a multiplying means 107 multiplies the absolute value of the actual speed by the preceding friction-coefficient estimated value De that has been already outputted. Next, a subtraction means 108 subtracts the output from the absolute value of the disturbance torque, and outputs the deviation. Then, a least-square gain means 105 multiplies the deviation by an estimation gain P, and outputs the multiplied value, and then an integration means 106 performs integral and outputs the result. This result gives the friction-coefficient estimated value De.

Therefore, according to Embodiment 4, because, in addition to the case of Embodiment 1, the friction-coefficient estimated value De estimated by the friction-coefficient estimating means 9 is estimated using the least square method, accurate and stable estimation of the friction coefficient becomes possible. Here, although not illustrated in the figure, when the actual speed vm is relatively slow, because estimation accuracy decreases, processes such as estimation execution and stop are performed in accordance with the speed. Moreover, although the estimation gain P is set at a fixed value this time, a method such as that the value is changed in accordance with the inputted value can be adopted. According to the above techniques, other statistical methods such as the sequential least square method and the fixed trace method can be also used.

EMBODIMENT 5

In Embodiment 5, a friction-coefficient setting means 11 is provided that outputs, when needed, to the overshoot-prevention-gain calculation means 10 the friction-coefficient estimated value De having been outputted from the friction-coefficient estimating means 9 in Embodiment 1.

Figure 7:
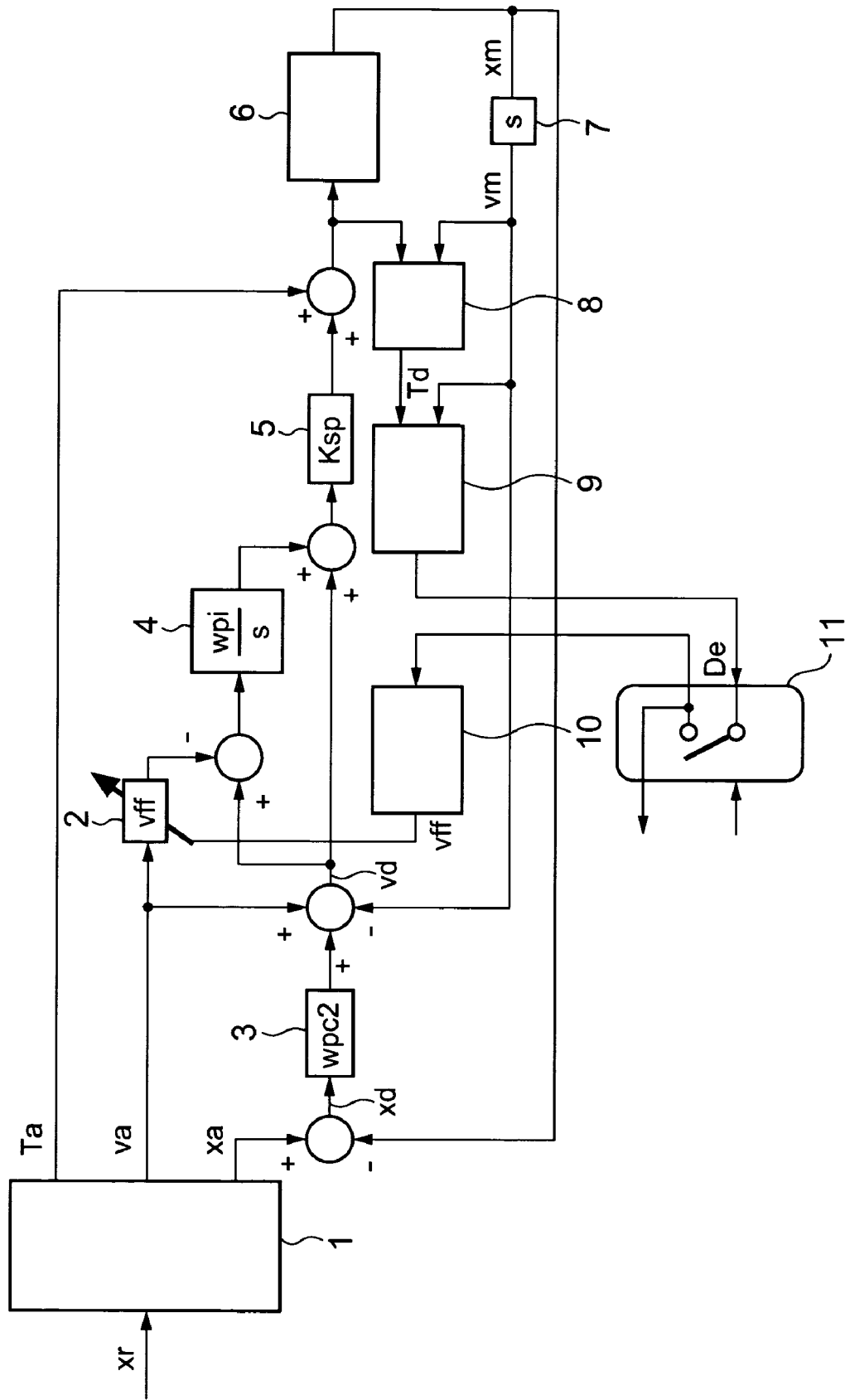
FIG. 7 is a block diagram illustrating entire Embodiment 5 according to the present invention.

FIG. 7 illustrates an entire block diagram in Embodiment 5 according to the present invention. In FIG. 7, the same numerals as those in FIG. 1 or FIG. 5 denote the same or equivalent parts. In the following, only the different parts from those in Embodiment 1 are explained.

A configuration in Embodiment 5 is explained.

The differing points from those in Embodiment 1 are that the friction-coefficient setting means 11 outputs to the overshoot-prevention-gain calculation means 10 the friction-coefficient estimated value De having been outputted from the friction-coefficient estimating means 9, and changes, as needed, the friction-coefficient estimated value De into a needed value. Because changes across the ages in the loss torque of the plant 6 occurs in a long time, the speed-integral-term feedforward gain vff is not always necessary to be varied by estimating in real-time the friction-coefficient estimated value De; thus, there may be a case in which, it is more than enough that, when a predetermined time has passed, the friction-coefficient estimated value De is only estimated and outputted into the overshoot-prevention-gain calculation means 10, so that the speed-integral-term feedforward gain vff is only updated. Moreover, when an action pattern in which the actual speed vm of the plant 6 is relatively high is included, because estimation of the friction coefficient becomes easy, if the friction-coefficient estimated value De is outputted only at that moment, the friction-coefficient estimated value De can be accurately outputted. Furthermore, when the friction-coefficient estimated value De is known in advance, by manually inputting and outputting this value, the friction-coefficient estimated value De that is most appropriate and suited to user preference can be outputted. Here, the friction-coefficient setting means 11 can be also configured in such a way that the friction-coefficient estimated value De is displayed according to a request from a user.

An operation in Embodiment 5 is explained.

In Embodiments 1-4, basically, the speed-integral-term feedforward gain vff for preventing the overshoot has been sequentially set using the result of the friction-coefficient estimation by the friction-coefficient estimating means 9; however, in Embodiment 5, the friction-coefficient setting means 11 switches on/off thereinside in response to needed timing, which enables estimation execution and stop of the friction-coefficient estimated value De. Moreover, the friction-coefficient setting means 11 changes the friction-coefficient estimated value De in response to requests from a user, and outputs. Using a friction coefficient having been estimated by this method, the speed-integral-term feedforward gain vff is set by the overshoot-prevention-gain calculation means 10; then, using the value, the coefficient of the speed feedforward multiplying means 2 is rewritten. The operations other than that are the same as those in Embodiment 1.

Therefore, because the friction-coefficient setting means 11 that outputs, when needed, into the overshoot-prevention-gain calculation means 10 the friction-coefficient estimated value De is provided, in addition to the case in Embodiment 1, only when the user requests, the friction-coefficient estimation can be executed.

That is, in this embodiment, because the friction-coefficient setting means 11 changes the friction-coefficient estimated value De and outputs, even though the friction-coefficient estimating means 9 is not included, if the friction-coefficient estimated value De requested by the user is correct, it is possible that an effect similar to that in Embodiment 1 is obtained.

EMBODIMENT 6

In EMBODIMENTS 1-5, although cases in which the controller is applied to the position P (proportional) and the speed PI (proportional and integral) control have been explained, it is possible that an effect according to the present invention can be also obtained in cases in which the controller is applied to other control. In Embodiment 6, the controller is applied to the position PI (proportional and integral) and the speed P (proportional) control.

Figure 8:
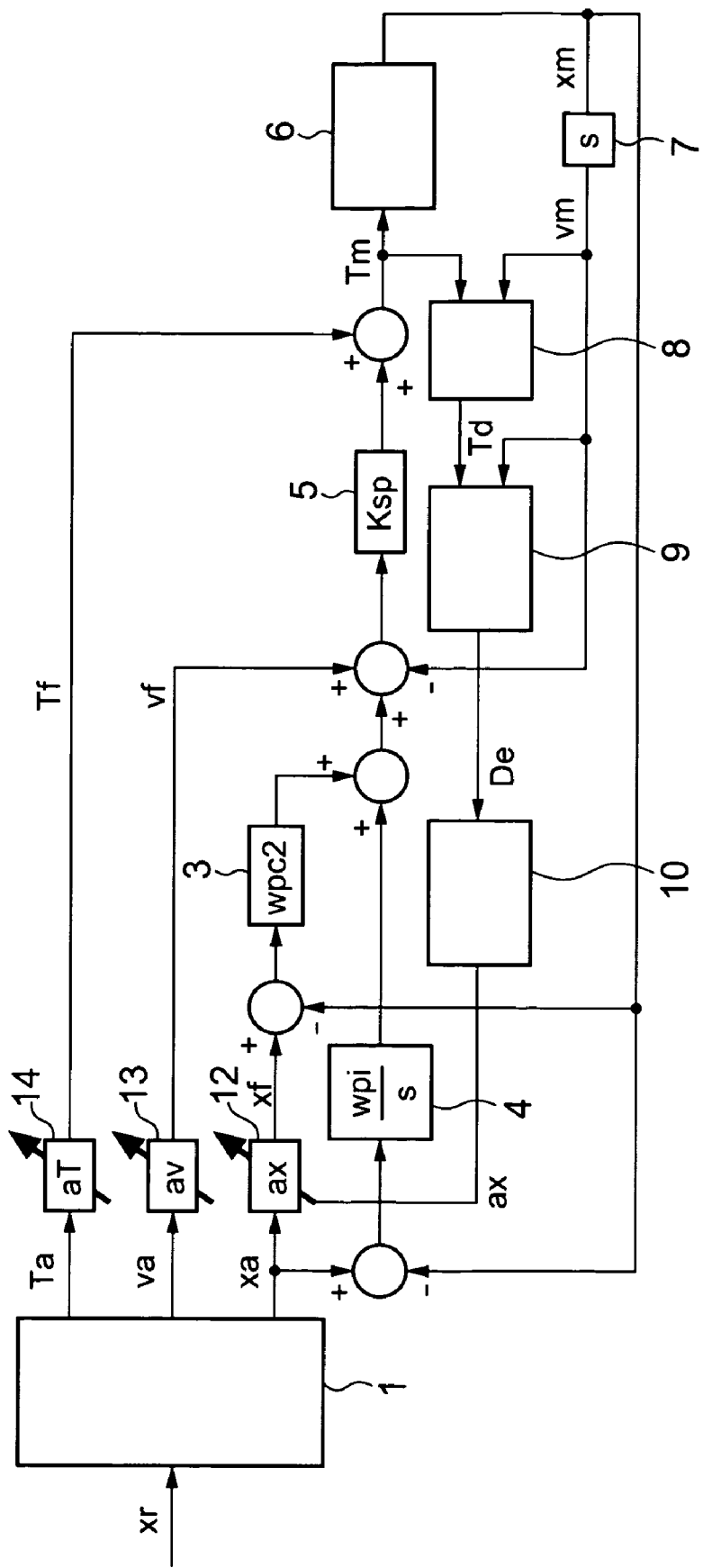
FIG. 8 is a block diagram illustrating entire Embodiment 6 according to the present invention.

FIG. 8 illustrates an entire block diagram in Embodiment 6 according to the present invention. In FIG. 8, the same numerals as those in FIG. 1 or FIG. 5 denote the same or equivalent parts. In the following, only the different parts from those in Embodiment 1 are explained.

A configuration in Embodiment 6 is explained.

The differing points in the entire block diagram are that a position-feedforward-coefficient means 12, a speed feedforward multiplying means 13, and a torque-feedforward-coefficient means 14 are included instead of the speed feedforward multiplying means 2. The position-feedforward-coefficient means 12, the speed feedforward multiplying means 13, and the torque-feedforward-coefficient means 14 each derive a feedforward position xf, a feedforward speed vf, and a feedforward torque Tf, respectively, after multiplying the model position xa, the model speed va, and the model torque Ta, as the respective input, by gains ax, av, and aT, respectively. Moreover, in Embodiment 6, the input into the position-proportional compensation means 3 becomes a position deviation of the feedforward position xf and the actual position xm, and the input into the integral compensation means 4 becomes a position deviation of the model position xa and the actual position xm. The input into the speed-proportional compensation means 5 becomes both of the position deviations, and speed deviations of the feedforward speed vf and the actual speed vm.

Moreover, Embodiment 6 is similar to Embodiment 1, etc. in that the overshoot-prevention-gain calculation means 10 outputs the most suitable gain for preventing the overshoot in response to the friction-coefficient estimated value De having been obtained in the friction-coefficient estimating means 9; however, because a gain equivalent to the case in Embodiment 1 is outputted corresponding to the position PI and the speed P control in Embodiment 6, the position-feedforward gain ax, the speed-feedforward gain av, and the torque-feedforward gain aT are calculated, and then outputted. The position-feedforward gain ax for preventing the overshoot is obtained by modifying the speed-integral-term feedforward gain vff that has been explained in Embodiment 1, and the most suitable value is expressed by Equation 8.

$$ax = 1 - wpi/wpc2 * De/Ksp \qquad (8)$$

In the block diagram, the configurations other than that are the same as those in Embodiment 1.

Next, an operation in Embodiment 6 is explained.

In Embodiment 6, if the position feedforward gain ax that is most suitable for preventing the overshoot is derived in the overshoot-prevention-gain calculation means 10, and then if the gain ax of the position-feedforward-coefficient means 12 is most suitably set using the value, the overshoot is most suitably prevented. The operations other than that are the same as those in Embodiment 1.

Therefore, in a case in which the controller is applied to the position PI (proportional and integral) and the speed P (proportional) control, a similar effect to that in Embodiment 1 can be also obtained.

Here, although only the position feedforward gain ax has been changed, by a method in which the speed feedforward gain av and the torque feedforward gain aT are suitably changed to match with the position feedforward gain ax, the high-frequency characteristics can be improved.

EMBODIMENT 7

In well-known semiconductor manufacturing apparatus, for example, using a servo-motor as a driver, a head that adheres to a substrate a tip having been cut off from a wafer is driven through a ball-screw mechanism that transforms the rotary operation of the servo-motor into an linear operation, as well as a vertical position of the head is controlled using a position controller. In such cases, the movable portions thereof include the loss torque of the servo-motor and sliding friction of the ball-screw; here, this friction includes a frictional component that is generally proportional to speed, and significantly varies with temperature and across the ages. By applying to such semiconductor manufacturing apparatus the position controllers in Embodiments 1-6, overshoot prevention can be most suitably set; consequently, problems such as the head and the workpiece contact to each other causing a damage can be prevented. Moreover, because the friction-coefficient estimated value De is automatically estimated in response to friction that varies across the ages, and the speed-integral-term feedforward gain vff is automatically controlled, the overshoot prevention can be automatically controlled.

INDUSTRIAL APPLICABILITY

The position controller or the controlling method according to the present invention is suited to position control for a machining tool and semiconductor manufacturing apparatus, etc.

What is claimed is:

1. A position controller having a feedforward system, comprising:
   a friction-coefficient-estimated-value setting means for setting arbitrary friction-coefficient-estimated-values;
   an overshoot-prevention-gain calculation means for determining speed-integral-term feedforward gain, based on estimated friction-coefficient values set by the friction-coefficient-estimated-value setting means; and
   a speed feedforward multiplying means for calculating the product of the speed-integral-term feedforward gain multiplied by a feedforward command value that is based on a positional command;
   the multiplication product from the speed feedforward multiplying means being used to reduce the feedforward term.

2. A position controller having a feedforward system, comprising:
   a friction-coefficient estimating means for estimating friction coefficients from disturbance torque estimated in controlling a plant;
   an overshoot-prevention-gain calculation means for determining speed-integral-term feedforward gain, based on the friction-coefficient estimated values estimated by the friction-coefficient estimating means; and
   a speed feedforward multiplying means for calculating the product of the speed-integral-term feedforward gain multiplied by a feedforward command value that is based on a positional command;
   the multiplication product from the speed feedforward multiplying means being used to reduce the feedforward term.

3. A position controller as recited in claim 2, wherein:
   the friction-coefficient estimating means includes a table setting out the estimated friction-coefficient values, correlated with speed-integral-term feedforward gain; and
   based on the table, speed-integral-term feedforward gain is determined from the estimated friction-coefficient values.

4. A position controller as recited in claim 2, further comprising a disturbance-observer for estimating the disturbance torque using torque inputted into, and the actual speed of, the controlled target.

5. A position controller as recited in claim 2, wherein the friction-coefficient value estimated by the friction-coefficient estimating means is estimated using the least mean square method.

6. A position controller as recited in claim 2, further comprising a friction-coefficient-estimated-value setting means for changing the estimated friction-coefficient values to arbitrary values when needed, and for outputting the changed values to the overshoot-prevention-gain calculation means.

7. A position controller as recited in any one of claims 1-6, further comprising:
   a model calculation means for calculating and outputting model position, model speed, and model torque, based on the positional command for the controlled target, wherein:
   the modeled position, the modeled speed, and the modeled torque are used as feedforward terms, and
   the controller is controlled in proportion to the modeled position and in integral proportion to the modeled speed.

8. A position controller as recited in any one of claims 1-6, further comprising:
   a model calculation means for calculating and outputting modeled position, modeled speed, and modeled torque, based on a positional command for the controlled target, wherein:
   the modeled position, the modeled speed, and the modeled torque are used as feedforward terms, and
   the controller is controlled in integral proportion to the modeled position, and in proportion to the modeled speed.

9. A position-controlling method including feedforward, comprising:
   a step of predefined values estimating friction coefficients;

a step of determining speed-integral-term feedforward gain based on the estimated friction-coefficient values that have been predefined;

a step of calculating the product of the speed-integral-term feedforward gain multiplied by a feedforward command value that is based on a positional command; and a step of using the multiplied value to reduce the feedforward term.

10. A position-controlling method including feedforward, comprising:

a step of estimating friction coefficients from disturbance torque estimated in controlling a plant;

a step of determining speed-integral-term feedforward gain based on the estimated friction-coefficient values that have been estimated;

a step of calculating the product of the speed-integral-term feedforward gain multiplied by a feedforward command value that is based on a positional command; and a step of using the multiplied value to reduce the feedforward term.

11. A position-controlling method as recited in either claim 9 or claim 10, further comprising:

a step of calculating and outputting modeled position, modeled speed, and modeled torque, based on the positional command for the controlled target; and a step of using, the modeled position, the modeled speed, and the modeled torque, as feedforward terms to perform position control in proportion to the modeled position, and in integral proportion to the modeled speed.

12. A position-controlling method as recited in either claim 9 or claim 10, further comprising:

a step of calculating and outputting modeled position, modeled speed, and modeled torque, based on the positional command for the controlled target; and a step of using, the modeled position, the modeled speed, and the modeled torque, as feedforward terms to perform position control in integral proportion to the modeled position, and in proportion to the modeled speed.

* * * * *